Patented Mar. 24, 1936

2,034,962

UNITED STATES PATENT OFFICE 2,034,962

PROCESSES OF HALOGENATING HYDROCARBONS

Omar H. Smith, West Englewood, N. J., assignor, by mesne assignments, to United States Rubber Company, New York, N. Y., a corporation of New Jersey No Drawing. Application August 29, 1934, Serial No. 742,009

11 Claims. (Cl. 260—160)

The invention broadly comprises halogenating aromatic hydrocarbons containing aliphatic hydrocarbon side chains attached to the aromatic nucleus, by acting upon the hydrocarbon material with halogen at an elevated temperature in the presence of a catalytic amount of an organic base, more particularly a base of non-volatile character, whereby halogenation is effected substantially in the side chain only. The amount of catalyst may vary but in each case is used in small amounts, that is catalytic amounts.

The catalyst may be of aliphatic, aromatic or heterocyclic nature. Typical examples of such compounds are diethylamine, dibenzylamine, pyridine, aldehyde-amine condensates such as are used in accelerating the vulcanization of rubber e. g. acetaldehyde-aniline condensate, heptaldehyde-aniline condensate, etc.

The invention is illustrated in connection with the halogenation of ethyl benzol. This material is used in the production of styrol, one such process being shown in U. S. Patent 1,687,903. Generally when ethyl benzol is treated with halogen, the halogen may enter the side chain, or the nucleus, or both the nucleus and the side chain, all depending on the temperature, presence or absence of sunlight, presence or absence of a catalyst of halogenation, all of which is well known in the art. At lower temperatures of halogenation, there is a greater tendency for the halogen to enter the nucleus.

The ultimate yield of styrol and the efficiency of the entire process depend largely on the manner of halogenating the ethyl benzol,—the more effective and intensive the halogenation, the less waste of halogen and the greater the amount of styrol that is produced per unit of halogen that is combined in the form of the halogenated ethyl benzol.

Heretofore phosphorous trichloride has been used as a catalyst of halogenation and this catalyst is compared below with above mentioned catalysts as well as with the use of heat alone without catalyst, in the halogenation of ethyl benzol.

115 grams of ethyl benzol were chlorinated in a series of tests. In each test the temperature of the ethyl benzol was maintained between 120 and 125° C. and the chlorine was passed into the ethyl benzol at the rate of 36 grams per hour. The chlorine loss was computed by doubling the amount of combined chlorine and subtracting this product from the amount of chlorine passed into the solution. The amount of combined chlorine (theoretical) should be one-half of the amount of chlorine passed into the solution as one atom of chlorine is evolved as hydrochloric acid for every atom which substitutes into the ethyl benzol. The loss of chlorine in percent is computed by dividing the amount of chlorine lost by the amount of chlorine that is actually consumed which is twice the organically combined chlorine.

Table I
Chlorination of ethyl benzol

| Test No. | Catalyst (parts per 100 parts of ethyl benzol) | Chlorine | | |
|---|---|---|---|---|
| | | Consumed | Combined | Loss in percent |
| 1 | None | 82 | 31.5 | 30 |
| 2 | 0.5 phosphorous trichloride | 72 | 34.5 | 4.3 |
| 3 | 0.5 acetaldehydeaniline | 72 | 35.0 | 3.0 |
| 4 | 0.5 acetaldehydeaniline | 61 | 30.5 | None |
| 5 | 0.5 pyridine | 67 | 33.5 | None |
| 6 | 0.6 dibenzylamine | 66 | 32 | 3.0 |

Not only does the use of the catalysts other than phosphorus trichloride show the loss of less chlorine in the chlorination process, but the amount of chlorine necessary to be passed into contact with the ethyl benzol to produce a given amount of chlorinated ethyl benzol can be reduced. In addition the catalysts besides being more effective than phosphorous trichloride are cheaper and more easily handled.

By the use of the catalysts other than phosphorus trichloride, the ultimate yield of styrol per unit of ethyl benzol or per unit of chlorine used may be appreciably raised. The reason for this greater efficiency is, that the use of the catalysts other than phosphorus trichloride suppresses the formation of nucleus-halogenated products and poly-halogenated-side chain products, and helps to form more monochlorethyl benzol for subsequent conversion into styrol from a given amount of ethyl benzol. This is shown by the figures in Table II resulting from polymerization and dehydrochlorination of the chlorinated ethyl benzol prepared in tests 1 to 6 of Table I.

TABLE II
Dehydrochlorination

| Test No. | Styrol in grams | Residue including ethyl benzol in grams | Recovered ethyl benzol in grams | Percent efficiency |
|---|---|---|---|---|
| 1 | 42 | 50 | 25 | 46.5 |
| 2 | 40.7 | 59 | 29.5 | 47.5 |
| 2 | 47.7 | 46.3 | 25.5 | 51.5 |
| 4 | 43.2 | 58.7 | 36.9 | 55. |
| 5 | 46.7 | 42.5 | 21.2 | 50. |
| 6 | 42 | 46.3 | 29.4 | 49. |

The efficiency is computed by dividing the amount of styrol produced by the amount of ethyl benzol consumed, the latter being equal to the weight of ethyl benzol taken less the amount recovered.

As little as .1% of catalyst may be used, the preferred amount being approximately 0.5 parts per 100 parts of the alkyl benzol. The temperature of the halogenation should be above 100° C., and preferably not above about 130° C. in the case of ethyl benzol, for efficient chlorination in the side chain. Instead of chlorine, bromine may be used and instead of ethyl benzol other alkyl benzols may be used, it being understood that as the alkyl groups increase in number, halogenated hydrocarbons are produced which may be used to prepare homologues of styrol, or alkyl styrols.

Having thus described my invention what I desire to protect by Letters Patent is:

1. A process of introducing halogen substantially entirely in an aliphatic hydrocarbon chain attached to an aromatic nucleus which comprises treating the aliphatic hydrocarbon substituted aromatic hydrocarbon with halogen at an elevated temperature in the presence of a small amount of an organic base as a catalyst of halogenation.

2. A process which comprises acting upon an alkyl benzol with halogen at an elevated temperature in the presence of a small amount of an organic base as a catalyst of halogenation, whereby to suppress nuclear halogenation and cause halogenation substantially in the alkyl group.

3. A process which comprises acting upon an alkyl benzol with chlorine at an elevated temperature in the presence of heat and a small amount of an organic base as a catalyst of chlorination, whereby to suppress nuclear chlorination and cause chlorination substantially in the alkyl group.

4. In a process of preparing a halo-alkyl benzol for use in the production of styrol or homologues thereof, the step of introducing halogen substantially entirely in the alkyl group by acting upon an alkyl benzol suitable for use in the production of styrol or homologues thereof with halogen at an elevated temperature in the presence of a catalytic amount of an organic base.

5. In a process of preparing a chlor-ethyl benzol for use in the production of styrol therefrom, the step of introducing chlorine substantially entirely in the ethyl group by acting upon ethyl benzol with chlorine at an elevated temperature in the presence of a small amount of an organic base as a catalyst of chlorination.

6. A process of preparing a halo-ethyl benzol for use in the production of styrol, which comprises introducing halogen into the ethyl benzol near the boiling point of the ethyl benzol and in the presence of a catalytic amount of an organic base, whereby to substantially suppress nuclear-halogenation of the ethyl benzol.

7. A process of preparing a halo-ethyl benzol for use in the production of styrol, which comprises introducing halogen into the ethyl benzol near the boiling point of the ethyl benzol and in the presence of a catalytic amount of pyridine, whereby to substantially suppress nuclear-halogenation of the ethyl benzol.

8. A process of preparing a chlor-ethyl benzol for use in the production of styrol, which comprises introducing chlorine into the ethyl benzol near the boiling point of the ethyl benzol and in the presence of a catalytic amount of pyridine, whereby to substantially suppress nuclear-chlorination of the ethyl benzol.

9. In a process of preparing chlorinated ethyl benzol for use in the production of styrol therefrom, the step of chlorinating ethyl benzol with chlorine at a temperature of from about 100° C. to about 130° C. in the presence of about 0.1 to about 0.5 percent of an organic base as a catalyst of chlorination.

10. A process of introducing halogen into an alkyl group directly connected to an aromatic nucleus which comprises treating an alkyl substituted cyclic compound with halogen at an elevated temperature in the presence of a small amount of an organic base as a catalyst of halogenation.

11. A process of introducing chlorine into an alkyl group directly connected to an aromatic nucleus which comprises treating an alkyl substituted cyclic compound with chlorine at an elevated temperature in the presence of a catalytic amount of an organic base.

OMAR H. SMITH.